United States Patent
Suto et al.

(10) Patent No.: US 11,601,337 B1
(45) Date of Patent: Mar. 7, 2023

(54) VIRTUAL SERVER GEOLOCATION DETECTION

(71) Applicant: Kyndryl, Inc., New York, NY (US)

(72) Inventors: Tiberiu Suto, Franklin, NY (US);
Nadiya Kochura, Bolton, MA (US);
Erik Rueger, Ockenheim (DE); Nicolo' Sgobba, Bratislava (SK)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 17/514,097

(22) Filed: Oct. 29, 2021

(51) Int. Cl.
| | | |
|---|---|---|
| *H04L 41/12* | (2022.01) | |
| *G06N 20/00* | (2019.01) | |
| *H04L 41/16* | (2022.01) | |

(52) U.S. Cl.
CPC ............. *H04L 41/12* (2013.01); *G06N 20/00* (2019.01); *H04L 41/16* (2013.01)

(58) Field of Classification Search
None
See application file for complete search history.

(56) References Cited

U.S. PATENT DOCUMENTS

| | | | |
|---|---|---|---|
| 8,180,887 B2 | 5/2012 | Li et al. | |
| 8,837,360 B1* | 9/2014 | Mishra | H04L 12/6418 370/254 |
| 10,713,635 B2 | 7/2020 | Thrope et al. | |
| 10,742,752 B2* | 8/2020 | Zmijewski | H04L 61/4511 |
| 10,824,654 B2 | 11/2020 | Chang et al. | |
| 10,959,204 B2 | 3/2021 | Kleinbeck et al. | |
| 2015/0111600 A1* | 4/2015 | Liu | H04W 64/00 455/456.1 |

(Continued)

FOREIGN PATENT DOCUMENTS

| | | |
|---|---|---|
| CN | 102246463 A | 11/2011 |
| JP | 2018-521610 A | 8/2018 |

OTHER PUBLICATIONS

Anonymous, "Keyword Driven Message Recollection based on Predictive Geolocation Data", IP.com, IPCOM000248319D, published Nov. 15, 2016 (3 pages) (Year: 2016).

(Continued)

*Primary Examiner* — Scott B Christensen
(74) *Attorney, Agent, or Firm* — Erik Swanson, Esq.; Kevin P. Radigan, Esq.; Heslin Rothenberg Farley & Mesiti P.C.

(57) ABSTRACT

Geographic location of a virtual server is predicted by determining a baseline geographic location of a virtual server of a computing environment, where the determining uses triangulation processing and known locations of multiple reference servers of the computing environment. Further, network communication-related data for communications between the multiple reference servers across a network is obtained, and a machine learning model is generated to predict an actual geographic location of the virtual server using, at least in part, the baseline geographic location of the virtual server and the obtained network communication-related data. The machine learning model is used to predict a current geographic location of the virtual server based, at least in part, on current network communication-related data for communications between the virtual server and one or more of the reference servers.

20 Claims, 15 Drawing Sheets

(56) References Cited

U.S. PATENT DOCUMENTS

| | | | | |
|---|---|---|---|---|
| 2015/0139007 | A1* | 5/2015 | Liu | G01S 5/0252 370/252 |
| 2019/0302221 | A1* | 10/2019 | Sheng | G01S 5/0252 |
| 2020/0163044 | A1* | 5/2020 | Bapat | H04W 64/00 |
| 2022/0070623 | A1* | 3/2022 | Nelson | H04W 4/029 |

OTHER PUBLICATIONS

Anonymous, "Location Prediction for Image and Video Content Based on Microfeatures", IP.com, IPCOM000263226D, published Aug. 7, 2020 (4 pages) (Year: 2020).

Fraga-Lamas, Paula et al., "A Review of Internet of Things for Defense and Public Safety", Sensors (16), published Oct. 5, 2016, www.mdpi.com/journal/sensors (44 pages) (Year: 2016).

Francis, Paul et al., "An Architecture for a Global Internet Host Distance Estimation Service", University of Michigan (17 pages) (Year: 1999).

Guyton, James D. et al, "Locating Nearby Copies of Replicated Internet Servers", University of Colorado at Boulder, Proceedings of ACMSIGCOMM, CU-CS-762-95 (19 pages) (Year: 1995).

IBM Publication, "z/Architecture Principles of Operation," IBM® Publication No. SA22-7832-12, 13th Edition, Sep. 2019 (pp. 1-2000).

Mel et al., "The NIST Definition of Cloud Computing," National Institute of Standards and Technology, Information Technology Laboratory, Special Publication 800-145, Sep. 2011 (pp. 1-7).

Tran, Minh, "Accurate Location Detection: System and Method that Allows for Cost Effective Location Detection Accuracy that Exceeds Current FCC Standards", White Paper, https://www.fix311.com/ (7 pages) (Year: 2015).

Tran, Khuyen, "Introduction to IBM Federated Learning: A Collaborative Approach to Train ML Models on Private Data", https://towardsdatascience.com/introduction-to-ibm-federated-learning-a . . . , (11 pages) (Year: 2020).

Yang, Shengwen et al., "Parallel Distributed Logistic Regression for Vertical Federated Learning Without Third-Party Coordinator" (6 pages) (Year: 2019).

* cited by examiner

VIRTUAL SERVER GEOLOCATION DETECTION

BACKGROUND

One or more aspects relate, in general, to facilitating processing within a computing environment, and in particular, to improving such processing.

A virtual server is, in one or more embodiments, a web server that shares computer resources with one or more other virtual servers. With a virtual server, the server shares hardware and software resources with other operating systems (OS), rather than being a dedicated server. Virtualization enables the separation of the image layer (operating system and application) from the underlying hardware platform, such that images can be freely moved from one host computer system to another host computer system, even without the need to restart the operating system or applications. Modern hosting providers can even move images between data centers for load balancing reasons. This concept has gained importance with the growing popularity of cloud computing. For a variety of reasons, a customer might need to know the current geographic location of the customer's virtual server(s) and data.

SUMMARY

Certain shortcomings of the prior art are overcome and additional advantages are provided through the provision, in one or more aspects, of a computer program product for facilitating processing within a computing environment. The computer program product includes one or more computer-readable storage media having program instructions embodied therewith. The program instructions are readable by a processing circuit to cause the processing circuit to perform a method which includes determining a baseline geographic location of a virtual server of the computing environment, where the determining uses triangulation processing and known locations of multiple reference servers of the computing environment. Further, the method includes obtaining network communication-related data for communications between the multiple reference servers across the network, and generating a machine learning model to predict an actual geographic location of the virtual server. The machine learning model is generated using, at least in part, the baseline geographic location of the virtual server and the obtained network communication-related data. The method further includes using the machine learning model to predict a current geographic location of the virtual server based, at least in part, on current network communication-related data for communications between the virtual sever and one or more of the reference servers.

Computer systems and computer-implemented methods relating to one or more aspects are also described and claimed herein. Further, services relating to one or more aspects are also described and may be claimed herein.

Additional features and advantages are realized through the techniques described herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1A:
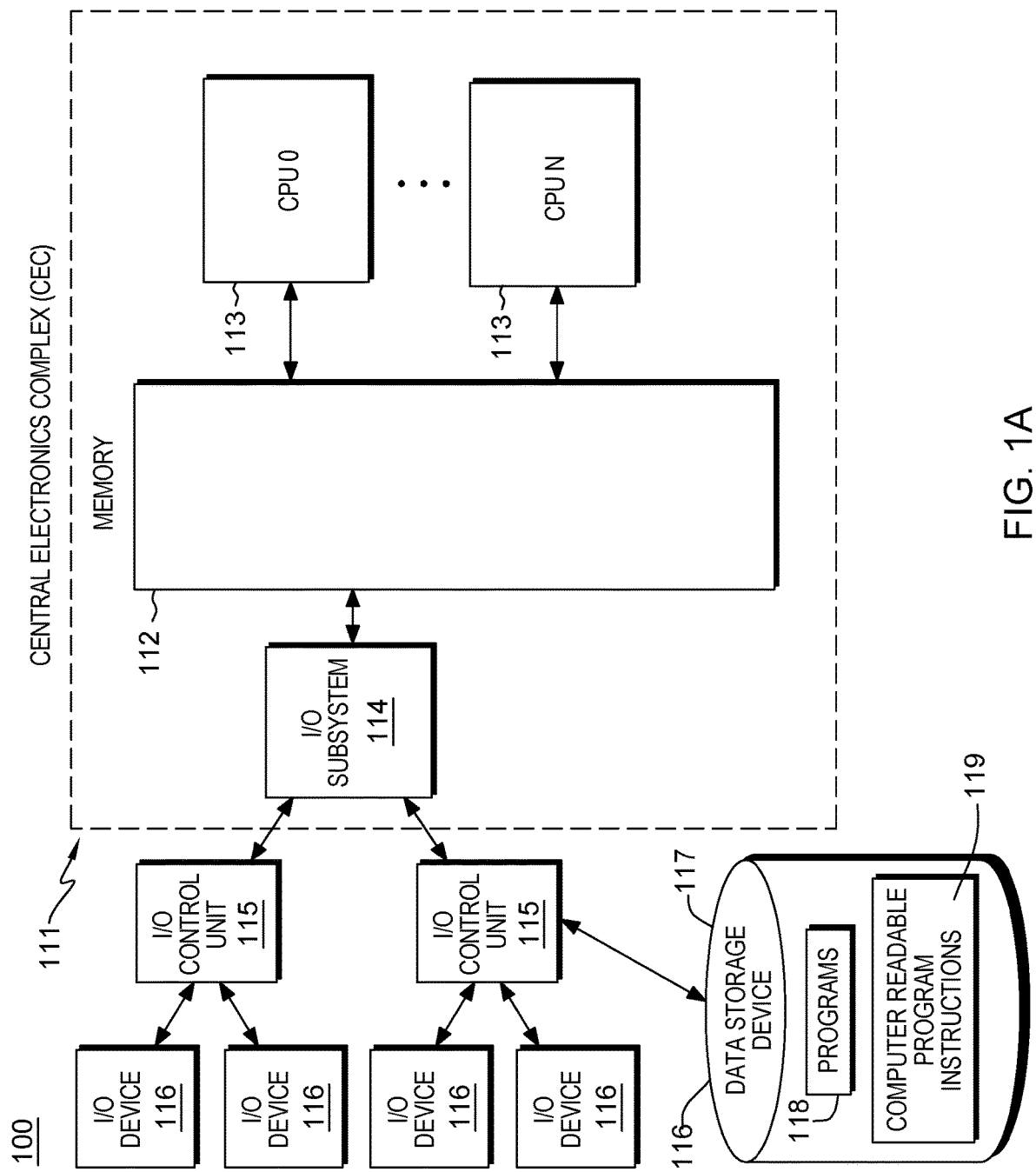
FIG. 1A depicts one example of a computing environment to incorporate and use one or more aspects of the present invention.

The accompanying figures, in which like reference numerals refer to identical or functionally similar elements throughout the separate views, and which are incorporated in and form a part of this specification, further illustrate the present invention and, together with the detailed description of the invention, serve to explain aspects of the present invention. Note in this regard that descriptions of well-known systems, devices, accelerators, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further, that numerous inventive aspects and features are disclosed herein, and unless inconsistent, each disclosed aspect or feature is combinable with any other disclosed aspect or feature as desired for a particular application of the concepts disclosed herein.

Note also that illustrative embodiments are described below using specific code, designs, architectures, accelerators, protocols, layouts, schematics or tools, only as examples, and not by way of limitation. Further, the illustrative embodiments are described in certain instances using particular hardware, software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

Figure 1B:
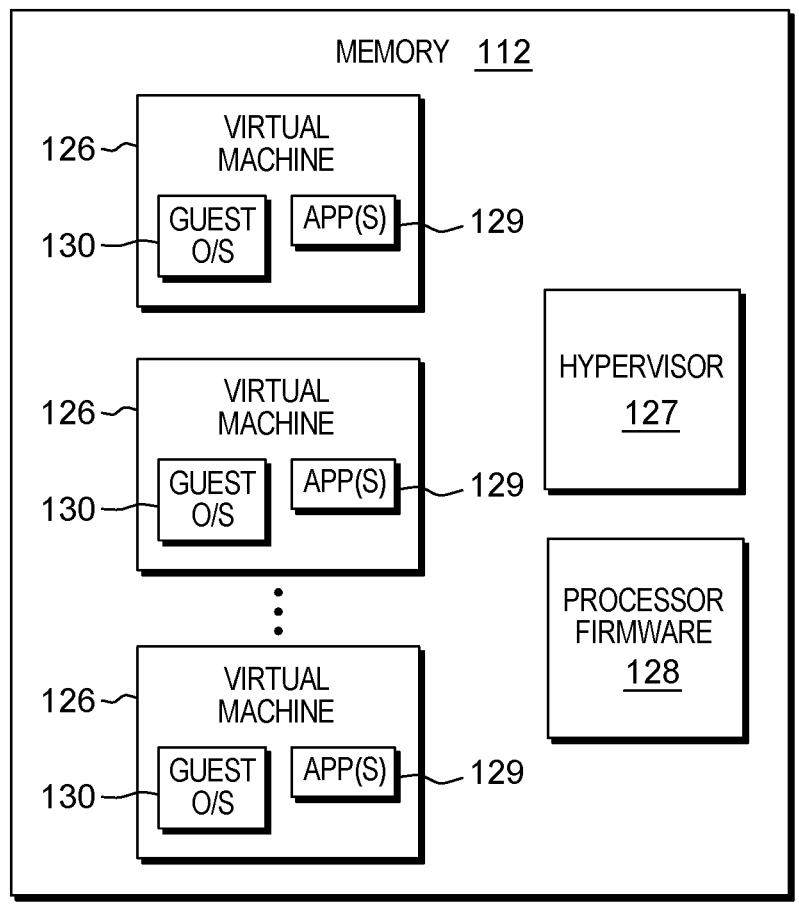
FIG. 1B depicts further details of a memory of FIG. 1A, in accordance with one or more aspects of the present invention.

As understood by one skilled in the art, program code, as referred to in this application, can include both hardware and software. For example, program code in certain embodiments of the present invention can include fixed function hardware, but other embodiments can utilize a software-based implementation of the functionality described. Certain embodiments combine both types of program code. One example of program code, also referred to as one or more programs or program instructions, is depicted in FIGS. 1A-1B as one or more of application program(s), computer-readable program instruction(s), and/or processor firmware, stored in memory 112 of computing environment 100, as well as programs 118 and computer-readable program instruction(s) 119, stored in a data storage device 117 accessed by computing environment 100.

Aspects of the present invention can be used in many types of computing environments. An example of a computing environment to incorporate and use one or more aspects of the present invention is described with reference to FIGS. 1A & 1B. As an example, the computing environment of FIGS. 1A & 1B is based on the IBM® z/Architecture® instruction set architecture offered by International Business Machines Corporation, Armonk, N.Y. IBM and z/Architecture are trademarks or registered trademarks of International Business Machines Corporation in one or more jurisdictions. The z/Architecture instruction set architecture, however, is only one example architecture. Again, the computing environment may be based on other architectures, including, but not limited to, the Intel® architectures, other architectures of International Business Machines Corporation, and/or architectures of other companies. Intel is a trademark or registered trademark of Intel Corporation or its subsidiaries in one or more jurisdictions.

In one example, a computing environment 100 includes a central electronics complex (CEC) 111. Central electronics complex 111 includes a plurality of components, such as, for instance, a memory 112 (a.k.a., system memory, main memory, main storage, central storage, storage) coupled to one or more processors, such as one or more general-purpose processors (a.k.a., central processing units (CPUs) 113) and optionally one or more special-purpose processors, and to an input/output (I/O) subsystem 114.

As examples, when present, the one or more special-purpose processors can be separate from the one or more general-purpose processors and/or at least one special-purpose processor can be embedded within at least one general-purpose processor. Other variations are also possible.

I/O subsystem 114 can be a part of the central electronics complex or separate therefrom. It directs the flow of information between main storage 112 and input/output control units 115 and input/output (I/O) devices 116 coupled to the central electronics complex.

Many types of I/O devices can be used. One particular type is a data storage device 117. Data storage device 117 can store one or more programs 118, one or more computer readable program instructions 119, and/or data, etc. The computer readable program instructions can be configured to carry out functions of embodiments of aspects of the invention.

Central electronics complex 111 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that, other hardware and/or software components could be used in conjunction with central electronics complex 111. Examples include, but are not limited to: microcode or millicode, device drivers, redundant processing units, external disk drive arrays, RAID systems, tape drives, and data archival storage systems, etc.

Further, central electronics complex 111 can be operational with numerous other general-purpose or special-purpose computing system environments or configurations. Examples of well-known computing systems, environments, and/or configurations that may be suitable for use with central electronics complex 111 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In one embodiment, the central electronics complex provides virtual machine support (either with or without logical partitioning support). As shown in FIG. 1B, memory 112 of central electronics complex 111 includes, for example, one or more virtual machines 126, a virtual machine manager, such as a hypervisor 127, that manages the virtual machines, and processor firmware 128. One example of hypervisor 127 is the IBM® z/VM® hypervisor, offered by International Business Machines Corporation, Armonk, N.Y. The hypervisor is sometimes referred to as a host. z/VM is a trademark or registered trademark of International Business Machines Corporation in at least one jurisdiction.

The virtual machine support of the central electronics complex provides the ability to operate large numbers of virtual machines 126, each capable of operating with different programs 129 and running a guest operating system 130, such as the Linux® operating system. Each virtual machine 126 is capable of functioning as a separate system. That is, each virtual machine can be independently reset, run a guest operating system, and operate with different programs. An operating system or application program running in a virtual machine appears to have access to a full and complete system, but in reality, only a portion of it is available. Although z/VM and Linux are offered as examples, other virtual machine managers and/or operating systems can be used in accordance with one or more aspects of the present invention. Note that the registered trademark Linux® is used pursuant to a sublicense from the Linux Foundation, the exclusive licensee of Linus Torvalds, owner of the mark.

Figure 2:
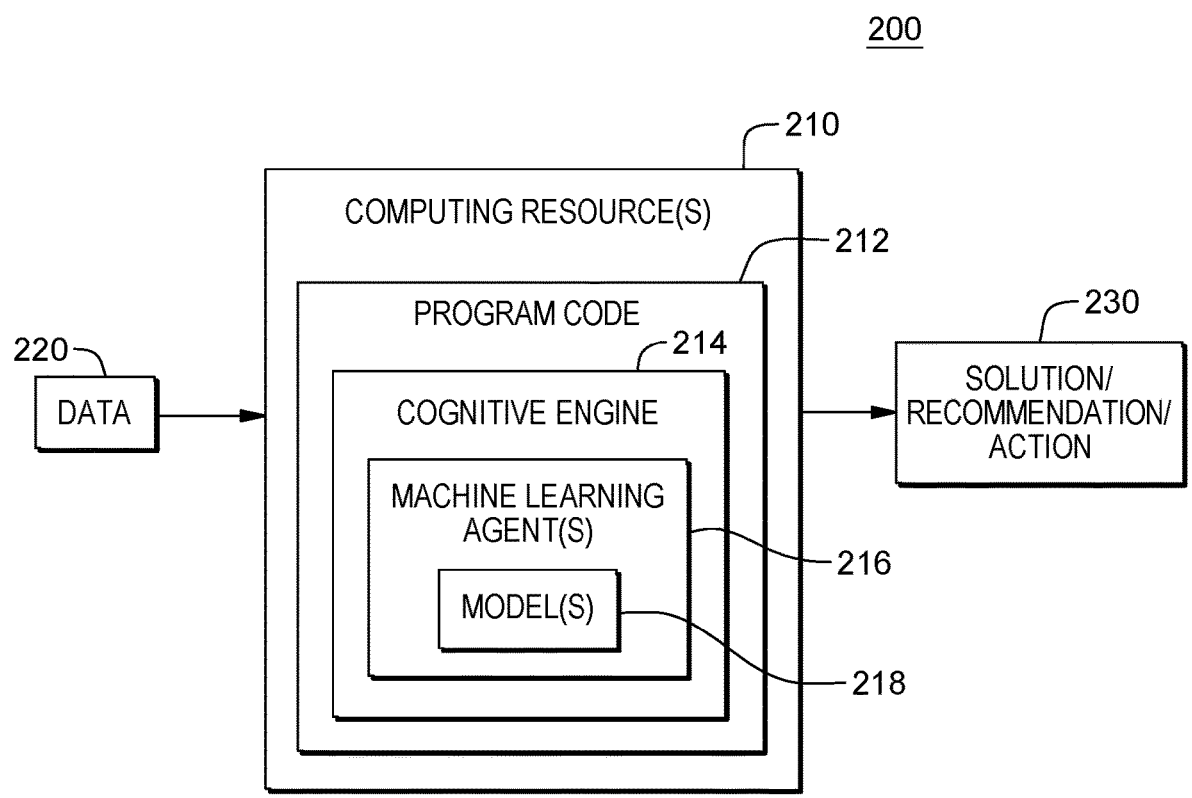
FIG. 2 illustrates another example of a computing environment to incorporate and use one or more aspects of the present invention.

FIG. 2 depicts a further embodiment of a computing environment or system 200, illustrating certain aspects of an embodiment of the present invention. In one or more implementations, system 200 can be part of a computing environment, such as a computing environment described above in connection with FIGS. 1A-1B. System 200 includes one or more computing resources 210 that execute program code 212 that implements a cognitive engine 214, which includes one or more machine-learning agents 216, and one or more machine-learning models 218. Data 220, such as the data discussed herein, is used by cognitive engine 214, to train model(s) 218, to predict a virtual server geographic location, and optionally, to generate one or more solutions, recommendations, actions 230, etc., based on the particular application of the machine-learning model. In implementation, system 200 can include, or utilize, one or more networks for interfacing various aspects of computing resource(s) 210, as well as one or more data sources providing data 220, and one or more systems receiving the predicted geographic location and/or the output solution, recommendation, action, etc., 230 of machine-learning model(s) 218. By way of example, the network can be, for instance, a telecommunications network, a local-area network (LAN), a wide-area network (WAN), such as the Internet, or a combination thereof, and can include wired, wireless, fiber-optic connections, etc. The network(s) can include one or more wired and/or wireless networks that are capable of receiving and transmitting data, including training data for the machine-learning model, predicted geographic location of a virtual server, and an output solution, recommendation, action, of the machine-learning model, such as discussed herein.

In one or more implementations, computing resource(s) 210 houses and/or executes program code 212 configured to perform methods in accordance with one or more aspects of the present invention. By way of example, computing resource(s) 210 can be a management server or other computing-system-implemented resource(s). Further, for illustrative purposes only, computing resource(s) 210 in FIG. 2 is depicted as being a single computing resource. This is a non-limiting example of an implementation. In one or more other implementations, computing resource(s) 210, by which one or more aspects of machine-learning processing such as discussed herein are implemented, could, at least in part, be implemented in multiple separate computing resources or systems, such as one or more computing resources of a cloud-hosting environment, by way of example.

Briefly described, in one embodiment, computing resource(s) 210 can include one or more processors, for instance, central processing units (CPUs). Also, the processor(s) can include functional components used in the integration of program code, such as functional components to fetch program code from locations in such as cache or main memory, decode program code, and execute program code, access memory for instruction execution, and write results of the executed instructions or code. The processor(s) can also include a register(s) to be used by one or more of the functional components. In one or more embodiments, the computing resource(s) can include memory, input/output, a network interface, and storage, which can include and/or access, one or more other computing resources and/or databases, as required to implement the machine-learning processing described herein. The components of the respective computing resource(s) can be coupled to each other via one or more buses and/or other connections. Bus connections can be one or more of any of several types of bus structures, including a memory bus or a memory controller, a peripheral bus, an accelerated graphics port, and a processor or local bus, using any of a variety of architectures. By way of example, but not limitation, such architectures can include the Industry Standard Architecture (ISA), the micro-channel architecture (MCA), the enhanced ISA (EISA), the Video Electronic Standard Association (VESA), local bus, and peripheral component interconnect (PCI). As noted, examples of a computing resource(s) or a computer system(s) which can implement one or more aspects disclosed herein are described further herein with reference to FIGS. 1A-1B, as well as with reference to FIGS. 9A-11.

As noted, program code 212 executes, in one implementation, a cognitive engine 214 which includes one or more machine-learning agents 216 that facilitate training one or more machine-learning models 218. The machine-learning models are trained using training data that can include a variety of types of data, depending on the model and the data sources. In one or more embodiments, program code 212 executing on one or more computing resources 210 applies machine-learning algorithms of machine-learning agent 216 to generate and train the model(s), which the program code then utilizes to predict, for instance, a virtual server's geographic location, and depending on the application, to perform an action (e.g., provide a solution, make a recommendation, perform a task, etc.). In an initialization or learning stage, program code 212 trains one or more machine-learning models 218 using obtained training data that can include, in one or more embodiments, network communication-related data associated with communications between servers of a network of a computing environment, such as described herein.

Figure 3:
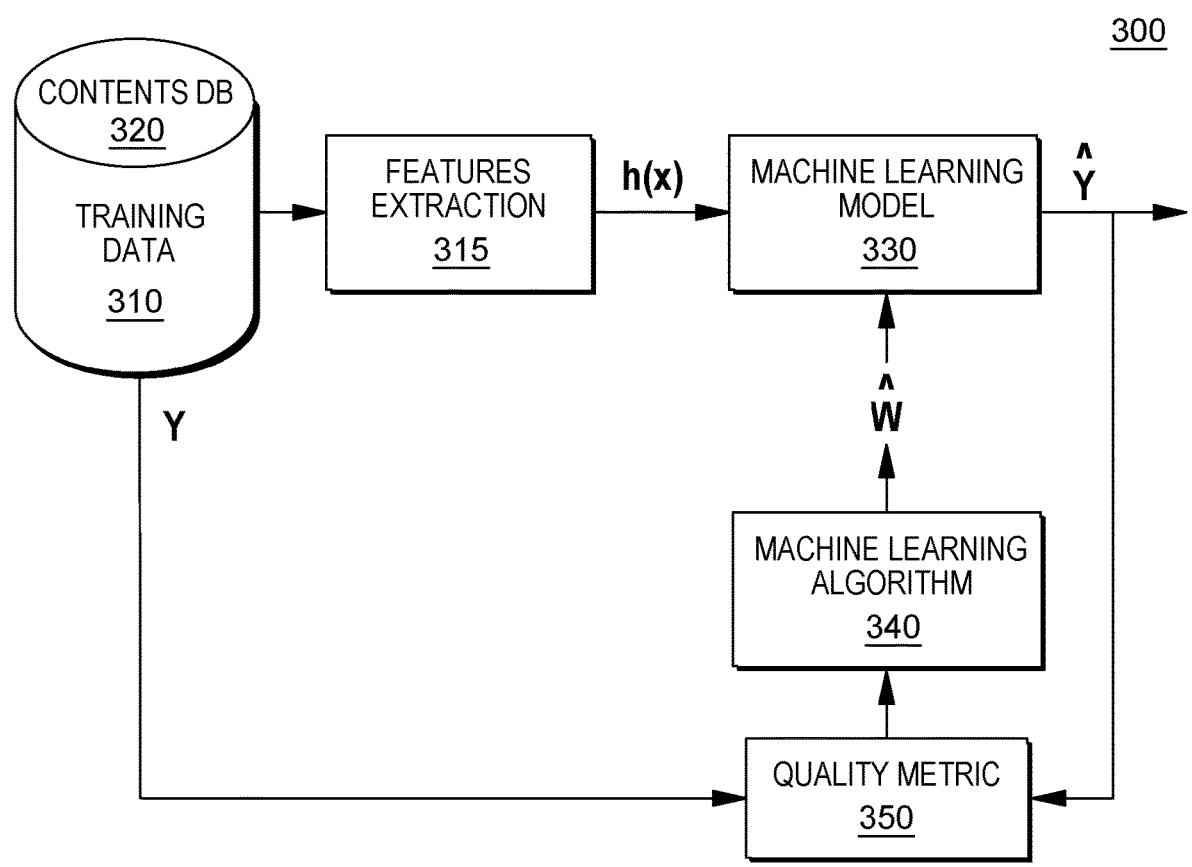
FIG. 3 illustrates various aspects of some embodiments of the present invention.

FIG. 3 is an example machine-learning training system 300 that can be utilized to perform machine-learning, such as described herein. Training data 310 used to train the model (in embodiments of the present invention) can include a variety of types of data, such as data generated by one or more network devices or computer systems in communication with the computing resource(s) 310. Program code, in embodiments of the present invention, can perform machine-learning analysis to generate data structures, including algorithms utilized by the program code to predict virtual server location and/or perform a machine-learning action. As known, machine-learning (ML) solves problems that cannot be solved by numerical means alone. In this ML-based example, program code extract features/attributes from training data 310, which can be stored in memory or one or more databases 320. The extracted features 315 are utilized to develop a predictor function, h(x), also referred to as a hypothesis, which the program code utilizes as a machine-learning model 330. In identifying machine-learning model 330, various techniques can be used to select features (elements, patterns, attributes, etc.), including but not limited to, diffusion mapping, principle component analysis, recursive feature elimination (a brute force approach to selecting features), and/or a random forest, to select the attributes related to the particular model. Program code can utilize a machine-learning algorithm 340 to train machine-learning model 330 (e.g., the algorithms utilized by program code), including providing weights for conclusions, so that the program code can train any predictor or performance functions included in the machine-learning model 340. The conclusions can be evaluated by a quality metric 350. By selecting a diverse set of training data 310, the program code trains the machine-learning model 340 to identify and weight various attributes (e.g., features, patterns) that correlate to enhanced performance of the machine-learned model.

Some embodiments of the present invention can utilize IBM Watson® as learning agent. IBM Watson® is a registered trademark of International Business Machines Corporation, Armonk, N.Y., USA. In embodiments of the present invention, the respective program code can interface with IBM Watson® application program interfaces (APIs) to perform machine-learning analysis of obtained data. In some embodiments of the present invention, the respective program code can interface with the application programming interfaces (APIs) that are part of a known machine-learning agent, such as the IBM Watson® application programming interface (API), a product of International Business Machines Corporation, to determine impacts of data on the machine-learning model, and to update the model, accordingly.

In some embodiments of the present invention, the program code utilizes a neural network to analyze training data and/or collected data to generate an operational model or machine-learning model. Neural networks are a programming paradigm which enable a computer to learn from observational data. This learning is referred to as deep learning, which is a set of techniques for learning in neural networks. Neural networks, including modular neural networks, are capable of pattern (e.g., state) recognition with speed, accuracy, and efficiency, in situations where datasets are mutual and expansive, including across a distributed network, including but not limited to, cloud computing systems. Modern neural networks are non-linear statistical data modeling tools. They are usually used to model complex relationships between inputs and outputs, or to identify patterns (e.g., states) in data (i.e., neural networks are non-linear statistical data modeling or decision-making tools). In general, program code utilizing neural networks can model complex relationships between inputs and outputs and identified patterns in data. Because of the speed and efficiency of neural networks, especially when parsing multiple complex datasets, neural networks and deep learning provide solutions to many problems in multi-source processing, which program code, in embodiments of the present invention, can utilize in implementing a machine-learning model, such as described herein.

As noted, a virtual server is, in one or more embodiments, a web server that shares computer resources with one or more virtual servers, and is not a dedicated physical sever. Virtualization enables the separation of the image layer (operating system and application) from the underlying hardware platform, such that images can be freely moved from one physical host computer system to another physical host computer system, even without the need to restart the operating system or applications. Modern hosting providers can even move images between data centers for load balancing reasons. This concept has gained importance with the growing popularity of cloud computing. For a variety of reasons, a customer might need to know the current geographic location of the customer's virtual server and data. In particular, it is advantageous for the customer to be able to learn the geographic location of the customer's virtual server and data without relying on any information provided by a hosting provider, such as asset information. In one embodiment, provided herein are computer program products, computer systems and methods which allow the owner of a virtual server within a computing environment to predict the geographic location of the virtual server at any given time, using information available through the virtual server, and the network(s) of the computing environment, independent of the hardware platform and operating system hosting the virtual server.

There are a variety of reasons why the owner of a virtual server might be interested in knowing the current geographic location of the virtual server and its data. For instance, moving a virtual server to another geographic location could change application response times due to network latency differences. It would be difficult for the owner to distinguish between virtual server performance issues and a latency increase if the owner is unaware of the location change. Further, legal or company regulations may require storing data in certain countries or political units, and not in others. Certain countries regulate the storage and transfer of various types of information across jurisdictional and geographical boundaries. Examples are the European Commission's Directive on Data Protection 95/46/EC, or the Swiss Federal Act on Data Protection. For disaster recovery purposes, a set of servers or certain data copies should not be located in the same data center, or even potentially within the same country. Still further, audits may require evidence about the virtual server (and its data) location. A clause in the hosting contract stating that the virtual server is located only in a specific data center may not serve as sufficient evidence for auditing purposes. For these, as well as other reasons, the ability to independently determine (by prediction) the current geographic location of a virtual server independent of the hosting provider is advantageous. Note in this regard that the solution to predict the geographic location of virtual severs disclosed herein are not deterministic, but rather, rely on a learning system that uses various network heuristics as machine learning model features in predicting the geolocation of the virtual server.

Generally stated, disclosed herein are computer program products, computer systems and methods for facilitating processing within a computing environment using program code executing on one or more computer resources. In one or more implementations, the program code determines a baseline geographic location of a virtual server of the computing environment using triangulation processing and known geographic locations of multiple reference severs of the computing environment. The program code obtains network communications-related data for communications between the multiple reference servers across the network, and generates a machine learning model to predict an actual geographic location of the virtual server. The machine learning model is generated using, at least in part, the baseline geographic location of the virtual server obtained using triangulation, and the obtained network communication-related data. Program code then uses the machine learning model to predict a current geographic location of the virtual server based, at least in part, on current network communication-related data for communications between the virtual server and one or more of the reference servers.

In one implementation, the obtained network communication-related data for communications between the multiple reference servers includes latency data for communications between the reference servers, and trace route data for communications between the multiple reference servers. In one implementation, the obtained network communication-related data for communications between the multiple reference servers across the network includes different network communication-related data types including, for instance, two or more of data types selected from the group comprising: network characteristic data, metadata associated with the communications, IP addresses associated with the communications, time of day of the communications, or additional server metadata.

In one embodiment, the current network communication-related data for communications between the virtual server and one or more of the reference servers includes latency data and trace route data for communications between the virtual server and the one or more of the reference servers. Further, in one embodiment, the generating of the machine learning model includes performing polynomial regression to establish a function converting communication latency into distance between servers.

In one or more implementations, the program code further retrains the machine learning model with additional network communication-related data, and the using of the machine learning model includes using the retrained machine learning model to predict the current geographic location of the virtual server based, at least in part, on the current network communication-related data for communications between the virtual server and the one or more of the reference servers. In one embodiment, the retraining includes using federated machine learning processing within the computing environment to retrain the machine learning model.

In one or more embodiments, the program code further initiates, an action based on the predicted current geographic location of the virtual server. In one implementation, the program code compares the predicted current geographic location of the virtual server with a database of known server hosting locations to locate the virtual server in a closest-known server location based on the predicted current geographic location of the virtual server.

Figure 4:
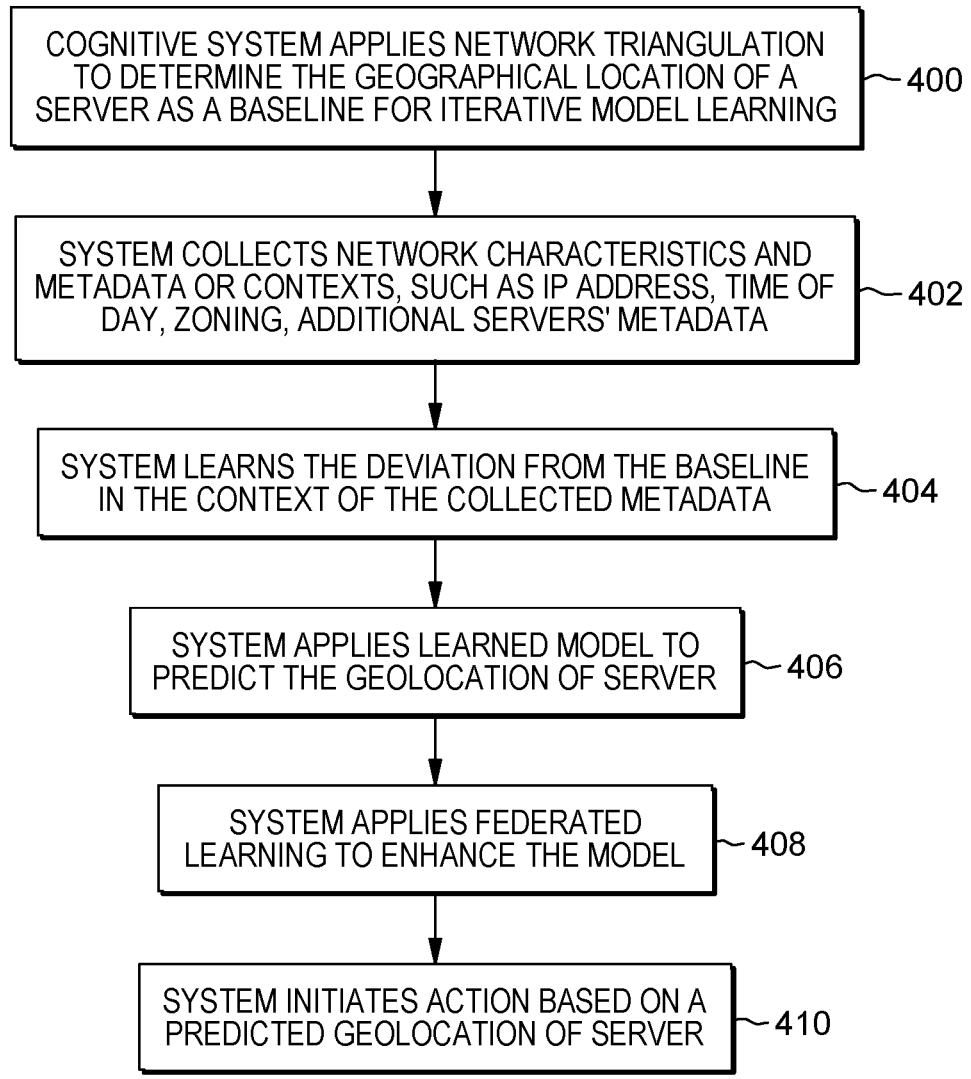
FIG. 4 depicts one embodiment of a workflow illustrating certain aspects of one or more embodiments of the present invention.

FIG. 4 depicts a further embodiment of a workflow illustrating certain aspects of one or more embodiments of the present invention. In one or more embodiments, a cognitive computer program product, computer system and method are provided which learns, or generates, a machine learning model, also referred to herein as a geolocation server prediction model, to predict the geographic location of a virtual server based on various network characteristics and/or metadata or contexts, such as IP address, time of day, and additional servers' metadata. Referring to FIG. 4, the cognitive system applies network triangulation to initially determine the geographic location of a virtual server as a baseline geographic location for iterative model learning 400. This baseline geographic location provides an approximate location of the virtual server for training the machine learning model. The system collects network characteristics and metadata or contexts, such as IP addresses, time of day, zoning, additional servers' metadata, etc., 402. The system learns the deviation from the baseline geographic location of the virtual server in the context of the collected data or metadata 404. As illustrated, the system applies the learned model to predict the geolocation of the virtual server 406. In one or more implementations, the system can optionally apply federated learning to enhance the machine learning model, and to leverage federated learning capabilities of addressing the data sets' heterogeneity, and privacy 408. In one or more implementations, the cognitive system initiates an action based on the predicted geolocation of the virtual server 410. Any of a variety of actions can be initiated by the system including, for instance, displaying an indication of the location of the virtual server, displaying a geographic map with the location of the virtual server identified, initiating moving of the virtual server from one location to another location, facilitating meeting reporting requirements or regulations based on the identified location of the virtual server, supplementing an audit with evidence about the virtual server geolocation; or taking any other action desired based on the predicted geographic location of the virtual server.

Advantageously, disclosed herein are computer program products, computer systems and methods which optimize, and continue to improve, server location detection preciseness, where triangulation processing is used to initially determine a baseline geographic location of a virtual server, and network characteristics are collected, as well as metadata, for machine learning of the model. The geolocation server prediction model is trained to learn any deviation from the baseline geolocation in the context of the collected data, and the model is applied, for instance, in a runtime environment, to identify a server's geographic location, as well as to improve the preciseness of the geolocation detection of the virtual server with real-time data, or metadata. In this manner, the machine learning model improves over time through retraining of the model with actual runtime data.

Figure 5:
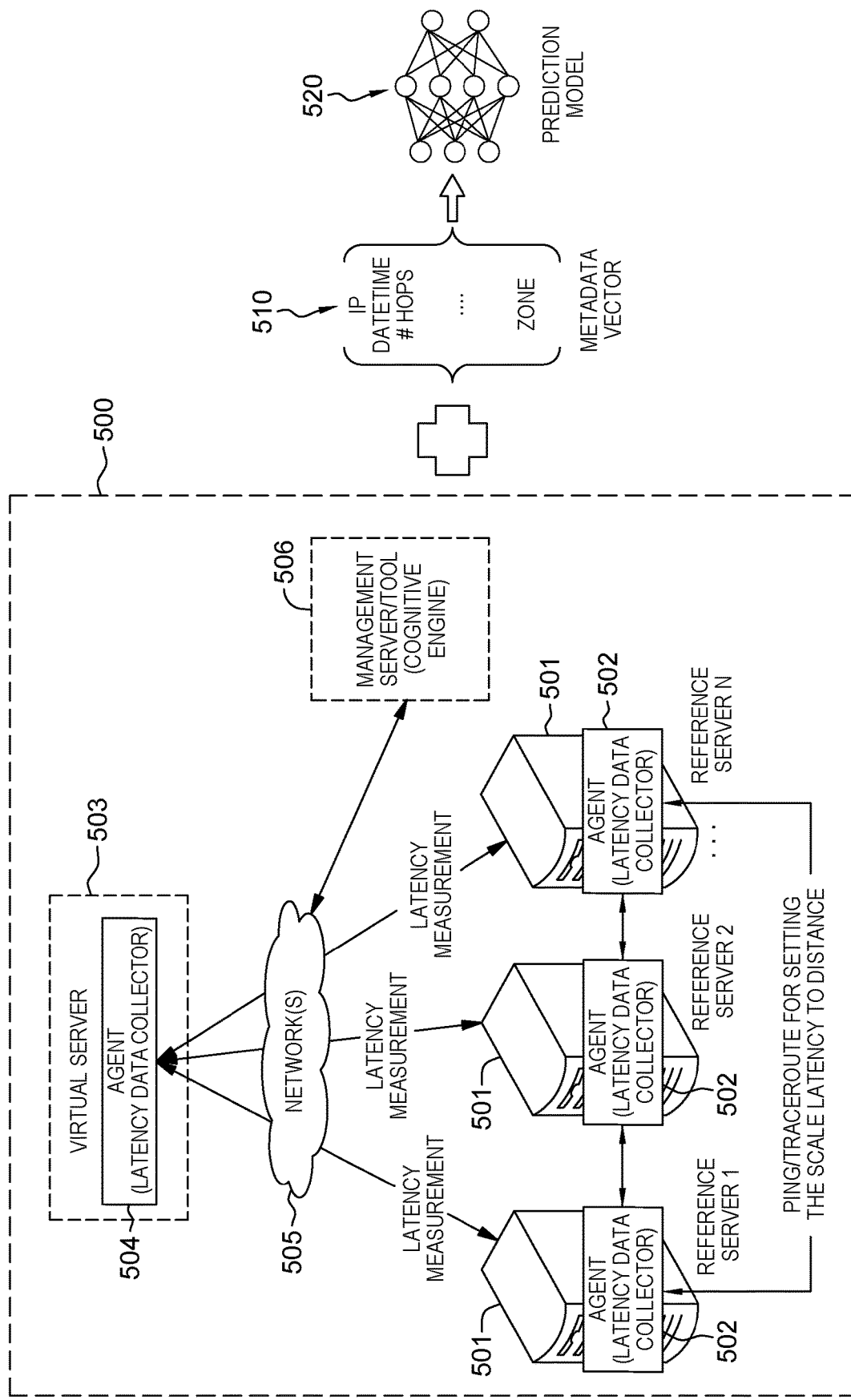
FIG. 5 depicts a further embodiment of a computing environment to incorporate and use one or more aspects of the present invention.

FIG. 5 depicts a further example of a computing environment to incorporate and use one or more aspects of the present invention. In the embodiment depicted, computing environment 500 includes multiple reference servers 501, each with a cognitive system agent 502 to facilitate latency data collection and reporting to, for instance, a management server/tool 506 implementing or incorporating a computer program product, computer system and/or method such as disclosed herein. Computing environment 500 further includes a virtual server 503 for which geographic location is to be predicted. In the embodiment illustrated, virtual server 503 further includes a cognitive agent or software which facilitates latency data collection 504, with latency being measured, in one embodiment, for communications between reference servers 501, as well as for communications between virtual server 503 and one or more of the reference servers 501. The communications between servers are across one or more networks 505. By way of example, network(s) 505 can be, for instance, a telecommunications network, a local-area network (LAN), a wide-area network (WAN), such as the Internet, or a combination thereof, and can include wired, wireless, fiber-optic connections, etc. The network(s) can include one or more wired and/or wireless networks that are capable of receiving and transmitting data, with associated metadata, such as described herein. In one implementation, the management server/tool 506 obtains, collects, receives, one or more types of data of a metadata vector 510, such as IP address, date and time, number of route hops, network zone, etc., in order to generate the geolocation server prediction model 520, such as discussed herein.

As noted, in one or more implementations, network triangulation is applied by the cognitive system, such as by management server/tool 506, to determine a baseline geographic location of virtual server 503. In one or more implementations, a functional relationship is obtained between latency measured in milliseconds and distance measured in kilometers by defining a set of reference servers with known geographic location, that is, with available, and verifiable, location information, and measuring the network signal travel time (latency) between the reference servers using, for instance, a network utility, such as a ping command. Data is then obtained to enrich and adjust the measured latency data from another network utility, such as a traceroute command, which analyzes the network paths between the reference servers. A polynomial regression is performed (in one embodiment) by the cognitive system to generate a function between latency (e.g., in milliseconds) and distance (e.g., in kilometers), which serves as a scale to convert latency into distance.

Figure 6A:
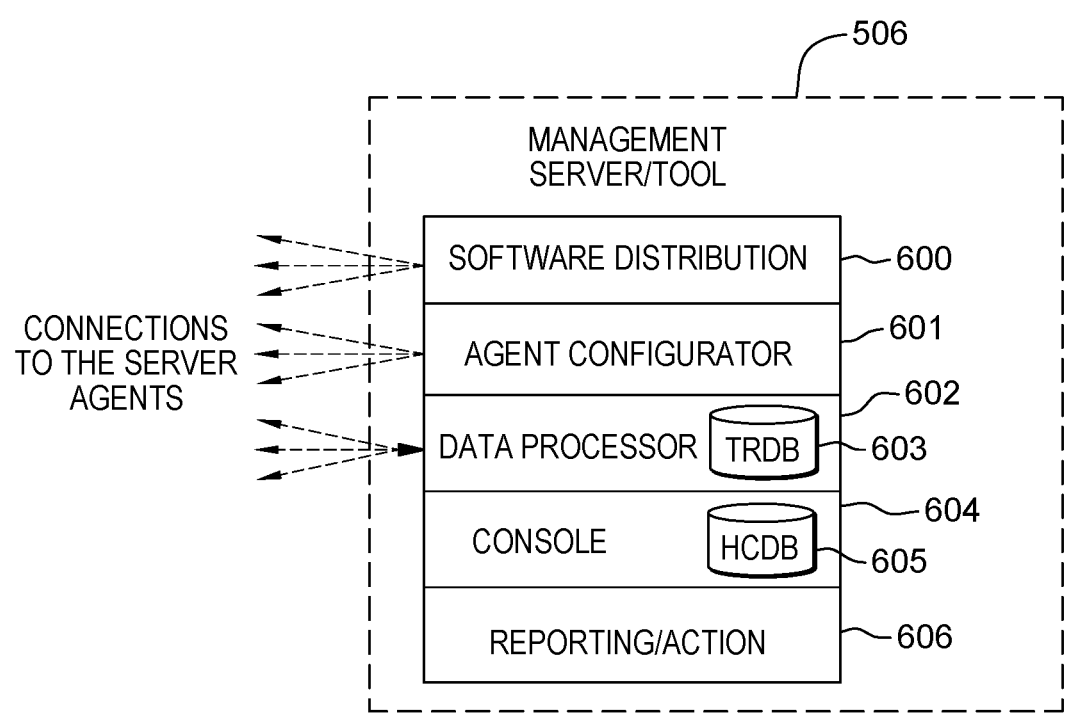
FIG. 6A depicts one embodiment of a management server or tool to incorporate and use one or more aspects of the present invention.
Figure 6B:
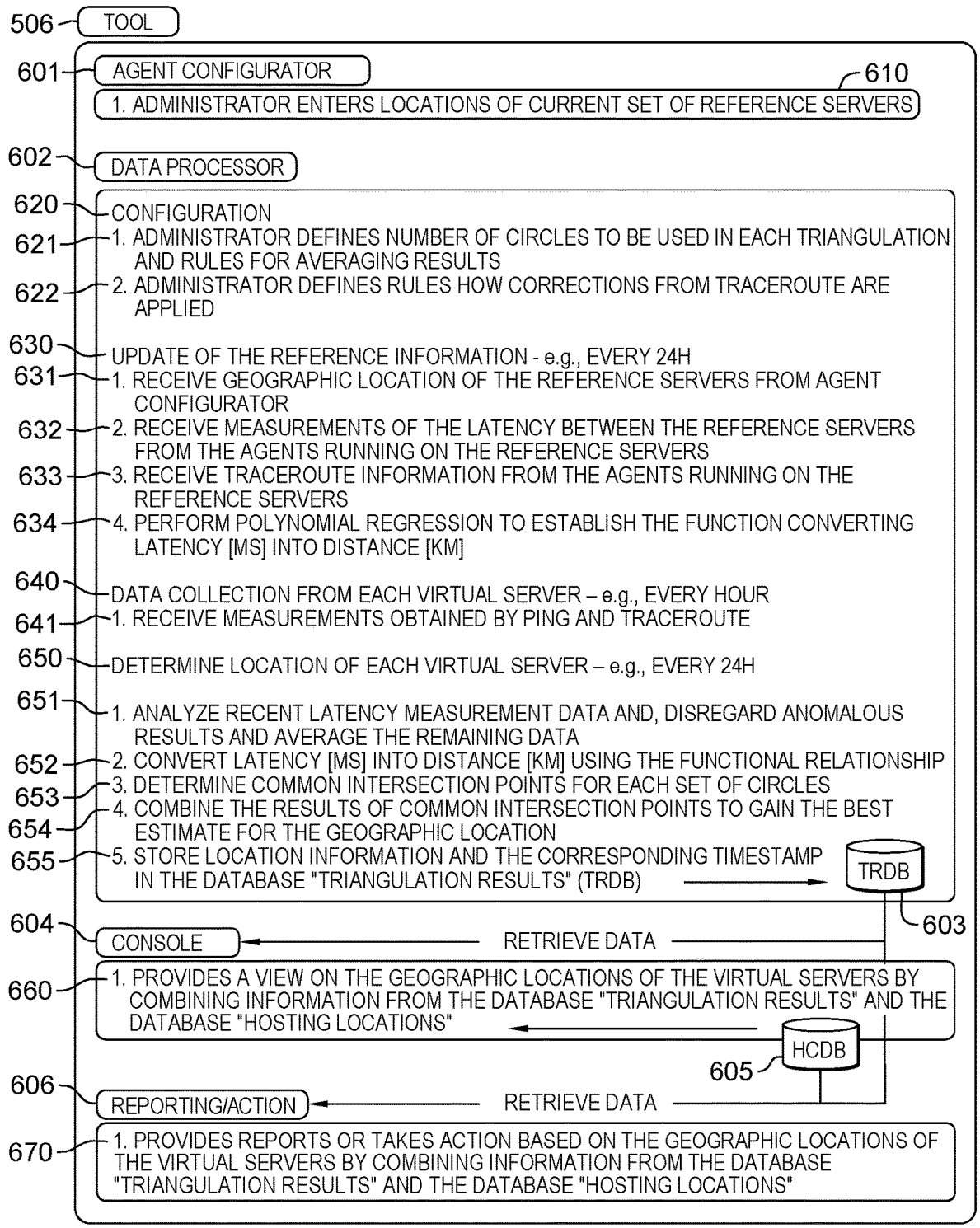
FIG. 6B depicts one embodiment of a workflow implemented by a management server or tool, such as depicted in FIG. 6A, in accordance with one or more aspects of the present invention.

FIGS. 6A & 6B depict further details of one embodiment of this process. In FIG. 6A, the management server/tool 506 is depicted to include, in one or more implementations, a software distribution component 600 for, for instance, distributing agent software to collect the desired latency and tracer route information, an agent configurator 601, a data processor 602 with access to a triangulation results database 603, a console 604, which accesses a host computer locations database 605, and a reporting/action component 606 to facilitate performing an action, such as disclosed herein.

In FIG. 6B, one embodiment of cognitive system processing is illustrated, where the agent configurator 601 of management server/tool 506 receives known locations of a current set of reference servers from, for instance, an administrator 610. The data processor 602 implements configuration processing which includes, for instance, in one embodiment, receiving from an administrator a number of circles to be used in each triangulation process, and rules for averaging results 621, as well as receiving from the administrator rules for how corrections from traceroutes are to be applied 622. The data processor code further includes update processing of the reference information, for instance, periodically, such as every 24 hours, 630, which includes in the depicted embodiment, receiving geographic location data for the reference servers from the agent configurator 621, receiving measurements of latency between the reference servers from the agents running on the reference servers 632, receiving tracer route information from the agents running on the reference servers 633, and performing polynomial regression to establish the function converting latency (such as in milliseconds) to distance (such as in kilometers) 634.

As noted, in one or more implementations, network triangulation is used to determine geographic location of a virtual server in an IP network for use as a baseline in the machine learning model. Network triangulation can use, in one or more embodiments, three or more reference servers with known geographic location as specific points within the computing environment, and measuring network signal travel time (i.e., latency) between the reference servers, and the virtual server for which the location is desired using, for instance, a network utility ping command.

A management server/tool 506 enriches and adjusts the measured latency data with data obtained from the network utility using, for instance, tracer route data, which analyzes the network paths between, for instance, one or more reference servers and the virtual server for which geographic location is desired. Measurement data, which can be collected for a defined period in order to enhance accuracy, can be filtered and any anomalous measurements disregarded for training the model. In one or more embodiments, a weighted average can be determined for each set of latency measurements between, for instance, a reference server and the virtual server for which geolocation is to be predicted. Once established, the latency can be converted into distance using the determined polynomial function.

Figure 7A:
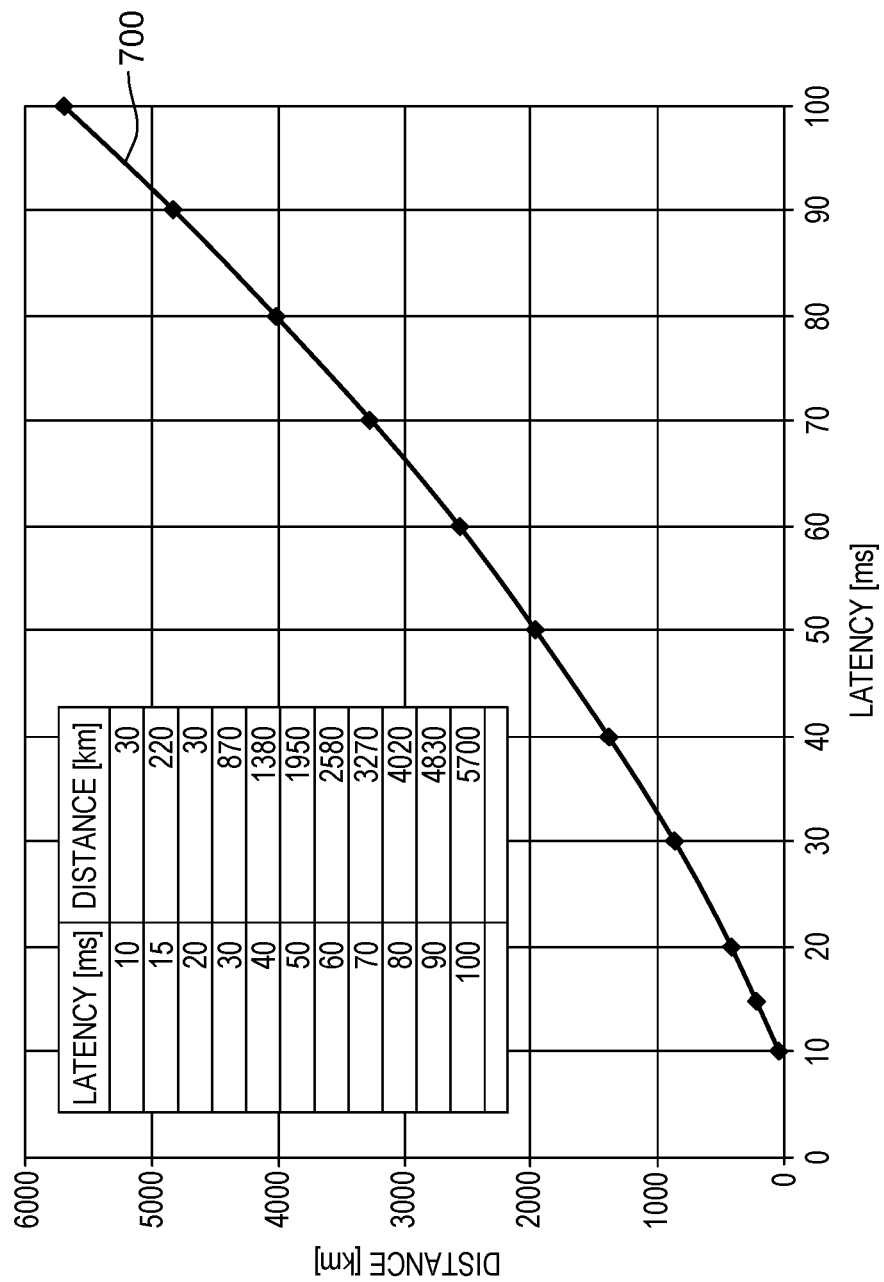
FIG. 7A depicts an example polynomial regression graph that can be used, in one embodiment, to convert communication latency to distance, in accordance with one or more aspects of the present invention.

By way of example, FIG. 7A depicts one embodiment of a polynomial regression graph that can be used to convert communication latency to geographic distance. In the example of FIG. 7A, distance in kilometers is plotted against latency in milliseconds, with a conversion function 700 being defined by the obtained data in the example presented, which is one example only of the concept.

In the example of FIG. 6B, data processor 602 obtains data from one or more, or each, virtual server. For instance, in one embodiment, data can be received or collected from each virtual server periodically, such as every hour 640. Measurements can be received using, for instance, a network ping command and traceroute command 641. Other data, such as metadata, can also be collected and used in training the machine learning model. As described herein, the cognitive system creates a baseline geographic location by, in one embodiment, applying an average of obtained data over multiple data samples. This feature can be presented as distances between the virtual server whose geolocation is to be predicted, and the reference servers projected in 2-D coordinates. The additional data can include, for instance, zoning information, such as whether the server is in the same zone or not, date and time information, IP address information, IP distribution information, number of router hops and network topology, as well as location of network routers, different size ICMP packets, etc. For instance, timing between packet groups can be used. For example, three ICMP packets of 1 KB size are sent 1 second apart, and compared with sending three ICMP packets of the same size 1 millisecond apart. The difference in reply time timings can provide further insight into the packet paths. Further, reply time data of ping packets via an http request sent to the same server can be ascertained. Many devices place different priority on ping packets than on http packets. In particular, an http request is anticipated to take longer due to web server overhead. However, this can be offset, adjusted and used as an additional datapoint to enhance accuracy of the model.

Figure 7B:
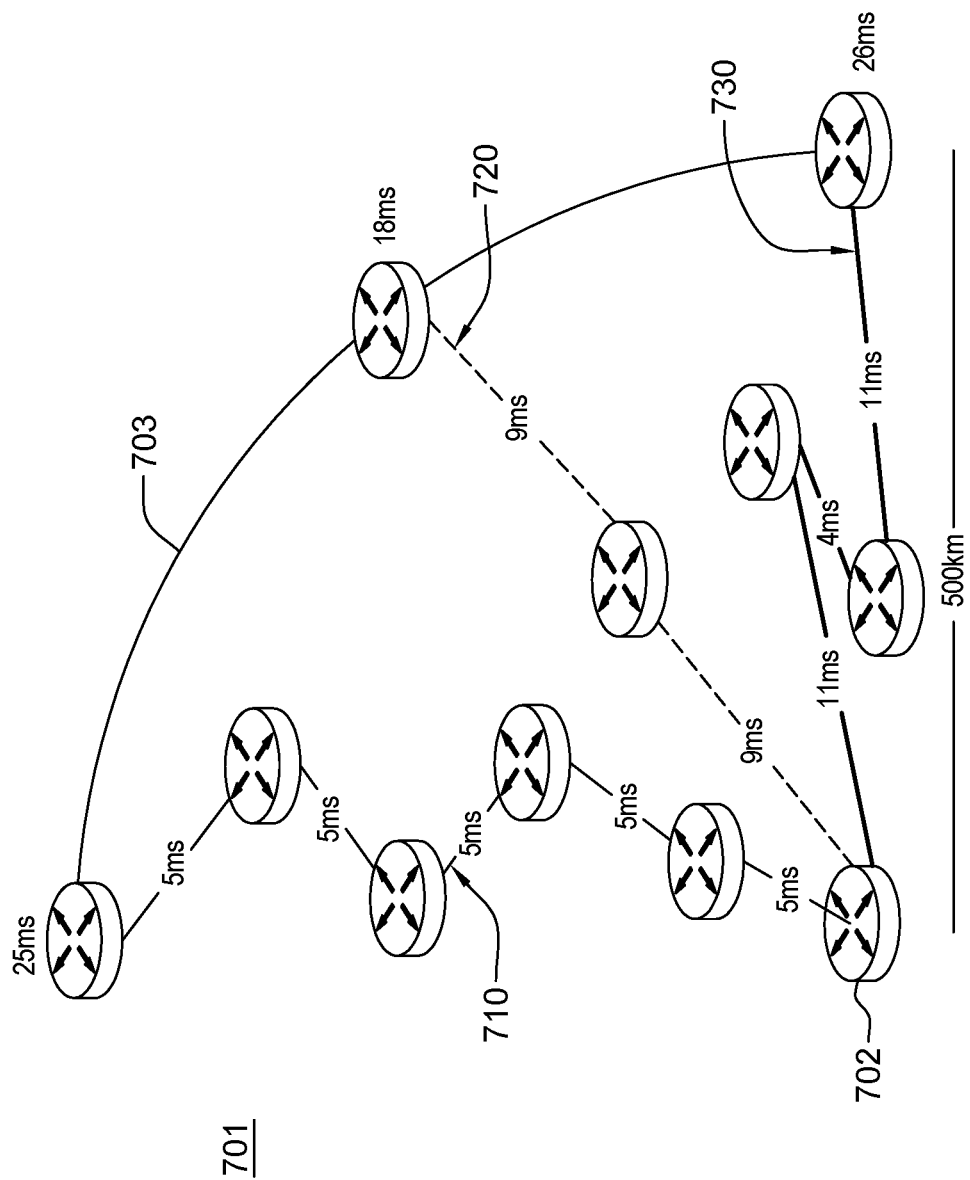
FIG. 7B depicts example network with multiple routers, wherein the number and location of routers of the network effect latency and trace routes, and which can be used in accordance with one or more aspects of the present invention.

By way of example, FIG. 7B depicts a network 701 with multiple routers, where the number and location of routers in a network path affect latency and trace routes. For instance, traversing from a virtual server connected to router 702 to a network edge 703 with multiple routers can take any of multiple paths, 710, 720, 730, with exemplary latencies between the routes and the different paths being illustrated, along with a different number of routers in each path. As shown, in one embodiment, the particular path selected affects latency in communications between the virtual server coupled to router 702 and one or more reference severs coupled to network edge 703.

Figure 7C:
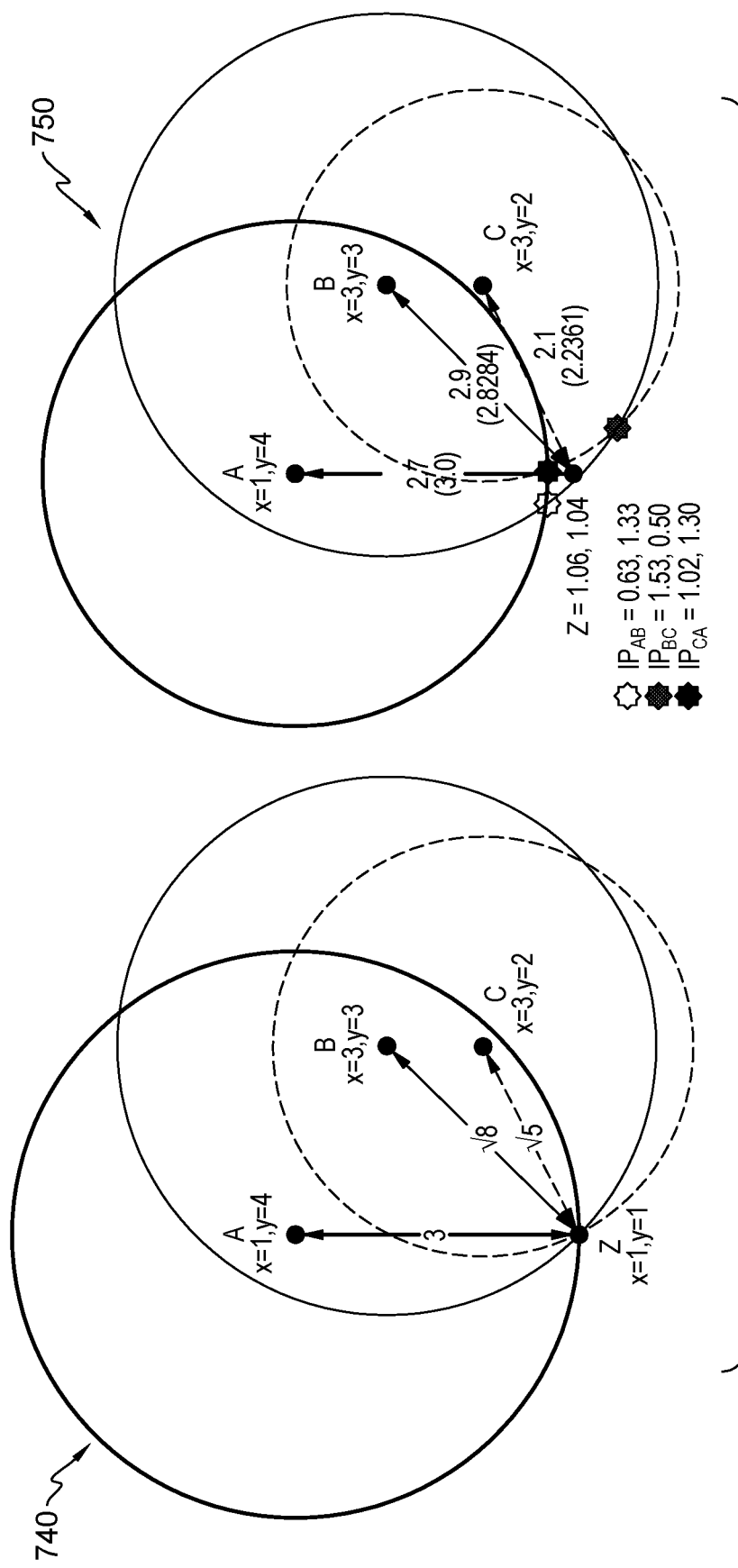
FIG. 7C depicts one example of intersections in location predictions due to measurement errors, which can be used in accordance with one or more aspects of the present invention.

As noted, the machine learning model can be established, in one embodiment, using multiple regression, which allows determination of the overall fit (any variance explained) of the model and the relative contribution of each of the predictors to the total variance explained. In one or more implementations, Support Vector Regression can be used to define acceptable datapoints. The cognitive system identifies any deviation between the baseline geographic location of the virtual server determined, such as described above, using the collected data or metadata. The system learns to translate any deviation into the acceptable distance error measurement as an approximation threshold of the predicted geographic location of the virtual server. FIG. 7C illustrates one example of this, where various intersections in location prediction due to measurement errors are depicted between the predicted data on the left and actual data on the right. As described herein, the geolocation of a server can be detected or determined using triangulation processing. For instance, having M reference servers (where M≥3), and using n (3≤n≤M) distances to the reference servers to determine an intermediate result for the geographic location of the server in question can be obtained using network triangulation. In particular, a circle with a radius of the measured distance between the reference server and the server in question can be drawn around each reference sever. The border conditions on the radii of the circles can be checked and the distances between the reference severs can be checked, that all circles intersect with other circles. The intersection points n*(n−1) of the circles can be determined, and the n*(n−1)/2 intersection points located closely to each other can be identified. Common intersection points of all n circles can be defined, as they are arithmetic mean (center of gravity) of the n*(n−1)/2 intersection points located closely to each other. The location of a point can be uniquely determined if the distances to (at least) three reference points are known. The location is given by the common intersection point of the circles, in one embodiment. Thus, applying measured data as input for a triangulation process can result in multiple circles, where each pair of circles intersects closely to an ideal intersection point Z. The center of gravity (i.e., arithmetic mean) of these three 2-circle intersection points can then be taken as an approximation of the common intersection point to arrive at the predicted geolocation for the model.

As illustrated in FIG. 6B, in one or more implementations, the data processor 602 of management server/tool 506 determines location of each virtual server, or any subset of the virtual servers, periodically, such as every 24 hours 650. In one embodiment, the cognitive system analyzes recent latency measurement data, disregarding anomalous results, and averages the remaining data 651. The latency (e.g., in milliseconds) is converted by the model into distance (e.g., in kilometers) using the functional relationship 652. In one implementation, the common intersection points for each set of circles are determined 653, and the results of the common intersection points are combined to gain the best estimate for the geographic location 654. The best estimate or prediction is then stored 655, along with the corresponding timestamp in the triangulation results database 603.

At any point in time, the stored, predicted virtual server geographic location can then be retrieved, for instance, by console 604, which (in one embodiment) provides a view on the geographic location of one or more of the virtual servers by combining information from the database triangulation results database (TRDB) 603 with the hosting computer locations database 605, which can be reported, delivered or displayed to a user of the management server/tool.

As illustrated in FIG. 6B, reporting/action component 606 can optionally retrieve the predicted virtual server geolocation information and provide, for instance, a report on the geographic locations of one or more of the virtual servers by combining information from the triangulation results database and the hosting computer locations database 670. As discussed herein, a variety of actions can be initiated by the system based on the predicted geographic location of a virtual server and its data.

Figure 8:
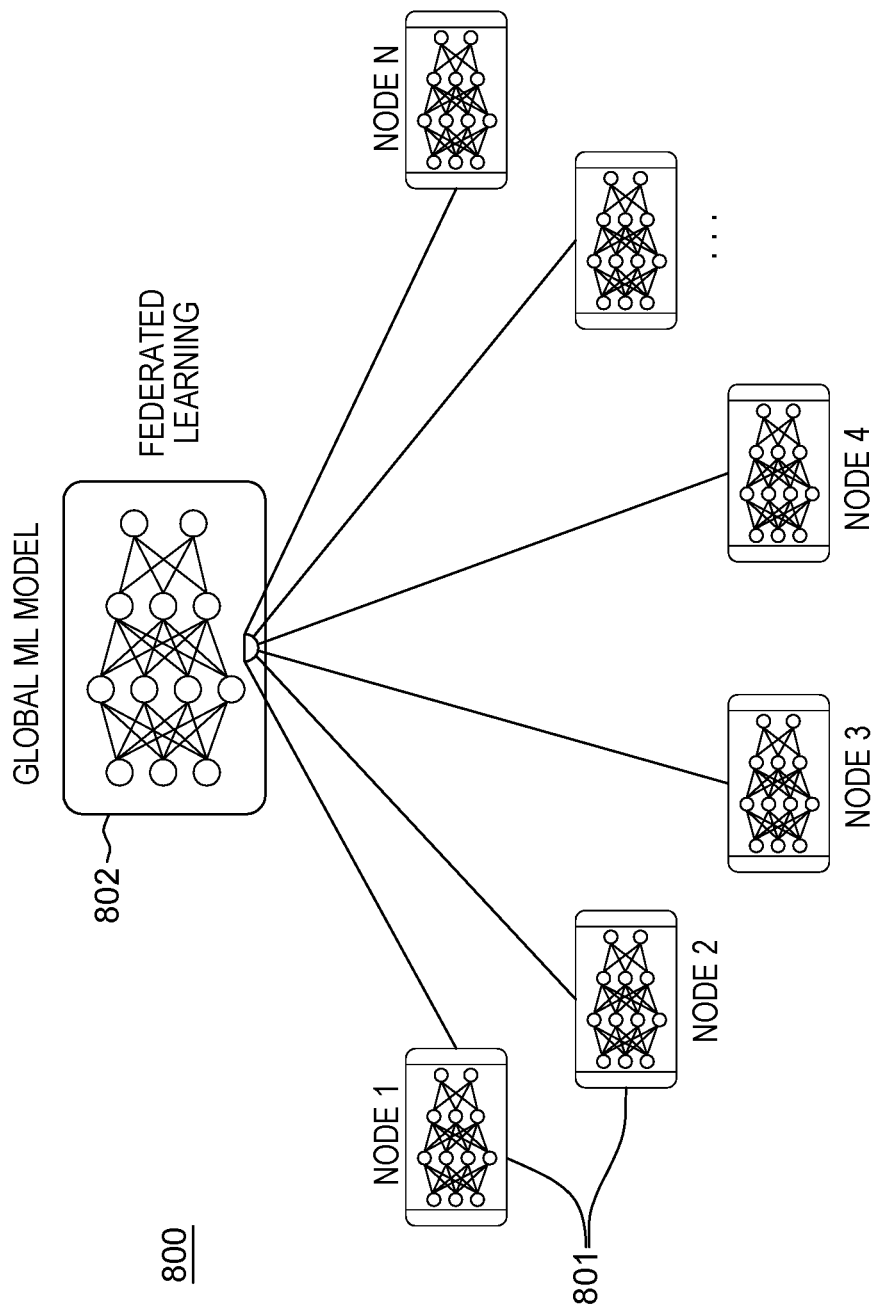
FIG. 8 depicts one embodiment of a federated machine learning architecture with a centralized learning server or tool, which can incorporate and use one or more aspects of the present invention.

Further, in one or more implementations, federated machine learning can be utilized to train the machine learning model across multiple decentralized servers holding the actual data obtained, without exchanging the actual data. FIG. 8 depicts one example of a federated learning architecture 800, with centralized learning. As illustrated, multiple distributed nodes 801 collect data orchestrated by a central federated learning server 802. In a centralized federated learning setting, a central server is used to orchestrate the different steps of the algorithm and coordinate the participating nodes during the learning process. The central server is responsible for the node selection at the beginning of the training process, and for the aggregation of received model updates.

Those skilled in the art will note from the description provided herein that a cognitive system with a geolocation server prediction model such as described can be integrated with network monitoring, such as a stand-alone server or tool. Further, the one or more agents performing latency measurements using, for instance, ping and/or tracer route commands, can be running on one or more of the reference servers, which are in control of the user's or customer's organization information, and in certain implementations, also run on the virtual server at issue. Triangulation results can be stored in a database, referred to herein as the triangulation results database. Further, reference server types can vary. For instance, servers controlled (e.g., leased or owned) by the customer or user, and hosted in a known location, can be used as reference. Also, any desktop PC with a fixed IP address can be used as reference. Three or more reference servers are used, in one or more embodiments, for triangulation. More servers, such as 10 servers, can be used to improve the results by averaging the obtained data.

Once a baseline geographic location of a virtual server is determined, then network latency to reference servers can be used to more specifically identify location of the virtual server. Latency can be obtained by network utilities, such as the ping and traceroute commands, which provide information that corresponds to the length of the network path between the servers. Note that a functional relationship is established between latency and distance based on measurements performed on the reference servers.

Figure 9A:
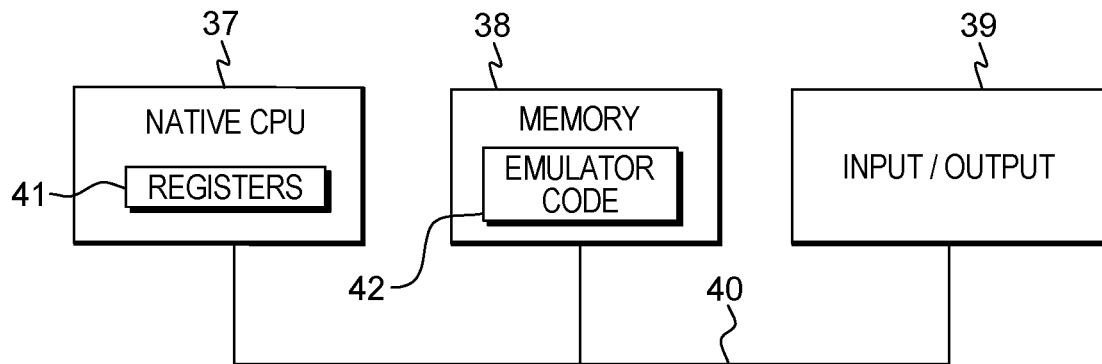
FIG. 9A depicts yet another example of a computing environment to incorporate and use one or more aspects of the present invention.

Another embodiment of a computing environment to incorporate and use one or more aspects of the present invention is described with reference to FIG. 9A. In this example, a computing environment 36 includes, for instance, a native central processing unit (CPU) 37, a memory 38, and one or more input/output devices and/or interfaces 39 coupled to one another via, for example, one or more buses 40 and/or other connections. As examples, computing environment 36 may include a Power® processor offered by International Business Machines Corporation, Armonk, N.Y.; an HP Superdome with Intel® processors offered by Hewlett Packard Co., Palo Alto, Calif.; and/or other machines based on architectures offered by International Business Machines Corporation, Hewlett Packard, Intel Corporation, Oracle, and/or others. PowerPC is a trademark or registered trademark of International Business Machines Corporation in at least one jurisdiction. Intel is a trademark or registered trademark of Intel Corporation or its subsidiaries in the United States and other countries.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture. For instance, emulator code 42 allows machines based on architectures other than the z/Architecture instruction set architecture, such as Power processors, HP Superdome servers or others, to emulate the z/Architecture instruction set architecture and to execute software and instructions developed based on the z/Architecture instruction set architecture.

Figure 9B:
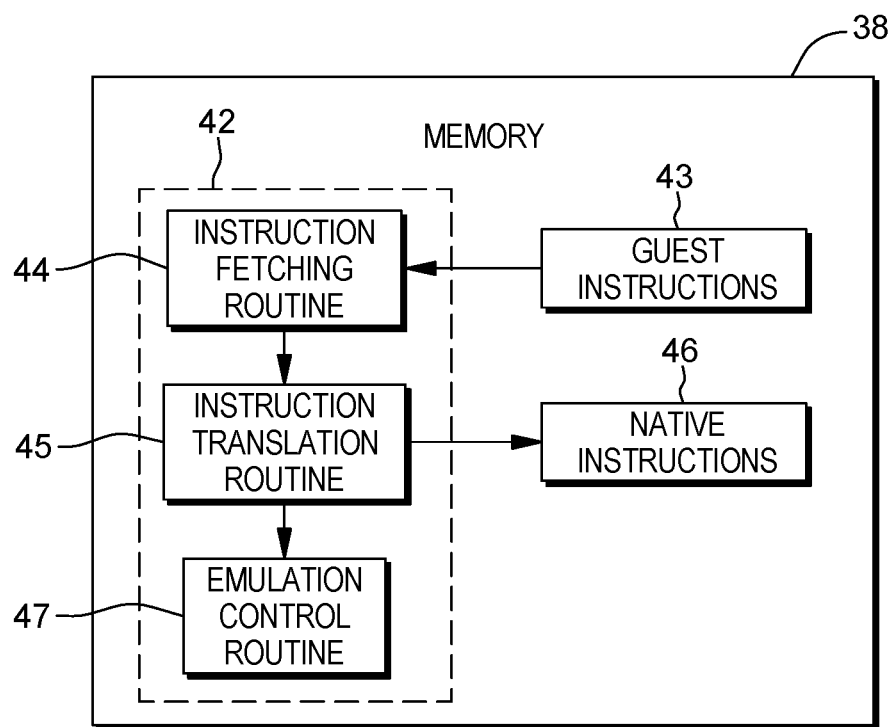
FIG. 9B depicts further details of the memory of FIG. 9A, in accordance with one or more aspects of the present invention.

Further details relating to emulator code 42 are described with reference to FIG. 9B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the z/Architecture instruction set architecture, but instead, are being emulated on native CPU 37, which may be, for example, an Intel processor. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

An instruction that may be emulated includes the Neural Network Assist Processing instruction described herein, in accordance with one or more aspects of the present invention. Further, other instructions and/or one or more aspects of neural network processing may be emulated, in accordance with one or more aspects of the present invention.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
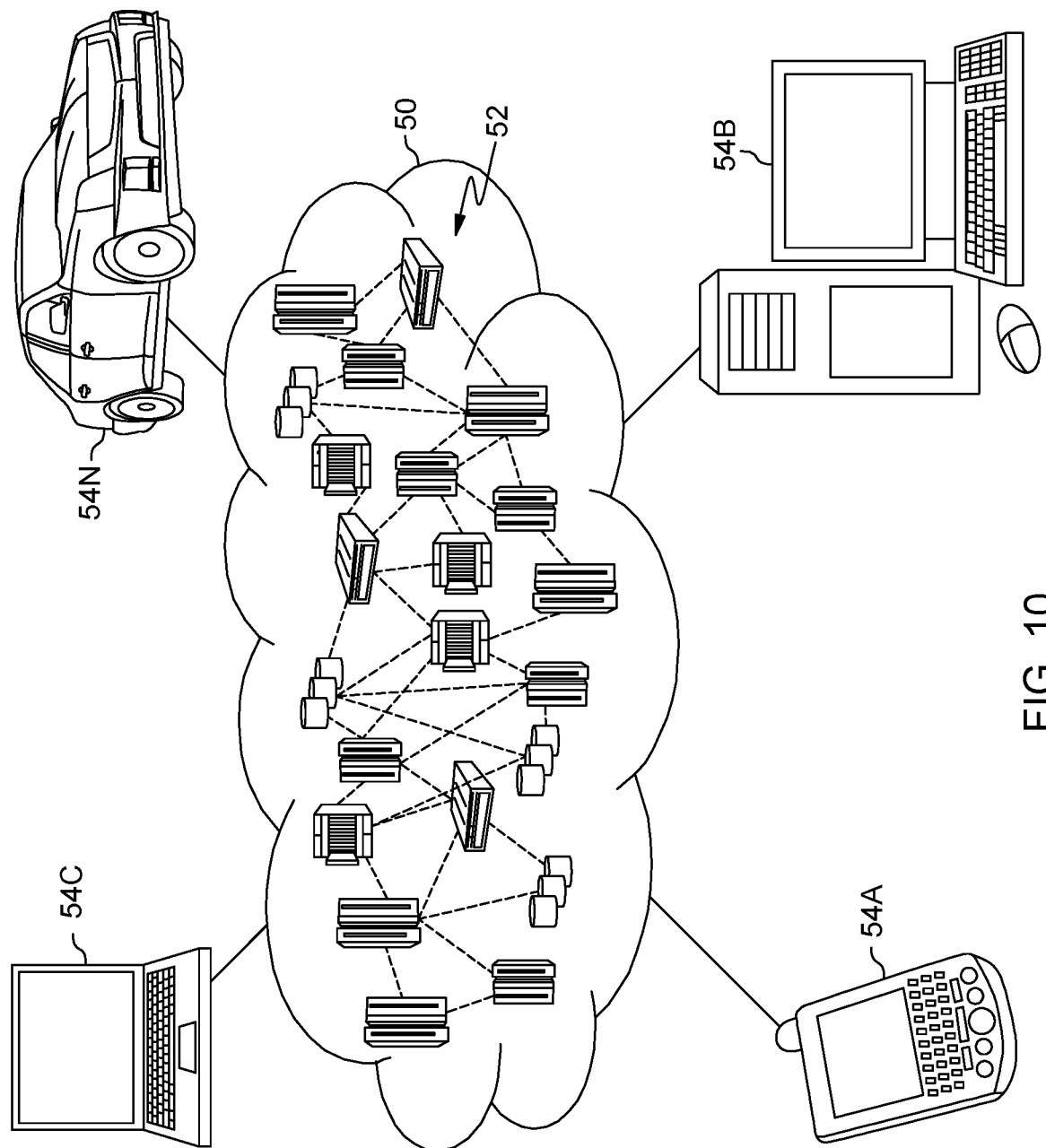
FIG. 10 depicts one embodiment of a cloud computing environment, in accordance with one or more aspects of the present invention.

Referring now to FIG. 10, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 52 and cloud computing environment 50 can communicate with any type of computerized device over any type of network and/or network addressable connection (e.g., using a web browser).

Figure 11:
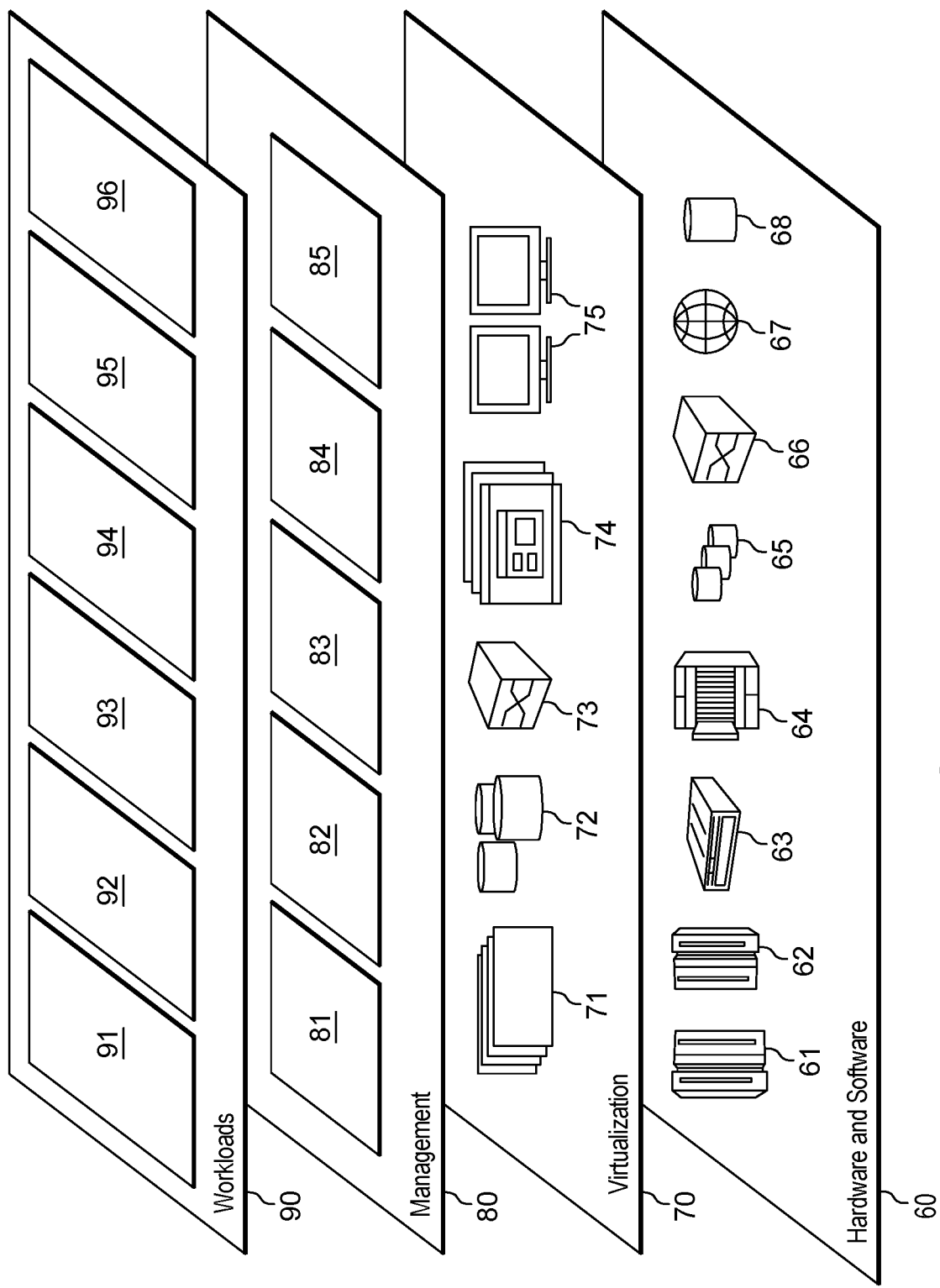
FIG. 11 depicts one example of abstraction model layers, in accordance with one or more aspects of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and server geolocation prediction processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For instance, computing environments of other architectures can be used to incorporate and/or use one or more aspects. Further, different instructions or operations may be used. Additionally, different types of registers and/or different registers may be used. Further, other data formats, data layouts and/or data sizes may be supported. In one or more embodiments, one or more general-purpose processors, one or more special-purpose processors or a combination of general-purpose and special-purpose processors may be used. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment by enabling an owner of a virtual server of the computing environment determine a location of the virtual server, the computer program product comprising:

one or more computer-readable storage media having program instructions embodied therewith, the program instructions being readable by a processing circuit to cause the processing circuit to perform a method comprising:

determining a baseline geographic location of the virtual server of the computing environment, the determining using triangulation processing and known locations of multiple reference servers of the computing environment, wherein the virtual server is configured to be hosted on one of a plurality of host computing systems of the hosting provider, with a current host computing system hosting the virtual server varying over time without notifying the owner of the virtual server;

obtaining network communication-related data for communications between the multiple reference servers across a network;

generating a machine learning model to predict for a given time an actual geographic location of the virtual server, the machine learning model being generated using, at least in part, the baseline geographic location of the virtual server and the obtained network communication-related data such that the machine learning model is useable to locate the virtual server at different times as the location of the server varies;

using the machine learning model to predict for a current time a current geographic location of the virtual server based, at least in part, on current network communication-related data for communications between the virtual server and one or more of the reference servers; and providing the current geographic location of the virtual server to the owner of the virtual server.

2. The computer program product of claim 1, wherein the obtained network communication-related data for communications between the multiple reference servers includes latency data for communications between the reference servers, and trace route data for communications between the multiple reference servers.

3. The computer program product of claim 1, wherein the obtained network communication-related data for communications between the multiple reference servers across the network comprise different network communication-related data types selected from the group consisting of: network characteristic data, metadata associated with the communications, IP addresses associated with the communications, time of day of the communications, and additional server metadata.

4. The computer program product of claim 1, wherein the current network communication-related data for communications between the virtual sever and one or more of the reference servers includes latency data and trace route data for communications between the virtual server and the one or more of the reference servers.

5. The computer program product of claim 1, wherein generating the machine learning model comprises performing polynomial regression to establish a function converting communication latency into distance between servers.

6. The computer program product of claim 1, further comprising retraining the machine learning model with additional network communication-related data, the using comprising using the retrained machine learning model to predict for the current time the current geographic location of the virtual server based, at least in part, on the current network communication-related data for communications between the virtual server and the one or more of the reference servers.

7. The computer program product of claim 6, wherein the retraining comprises using federated machine learning processing within the computing environment to retrain the machine learning model.

8. The computer program product of claim 1, further comprising initiating an action based on the predicted current geographic location of the virtual server.

9. The computer program product of claim 1, further comprising comparing the predicted current geographic location of the virtual server with a database of known host computer system locations to locate the virtual server in a closest-known hosting computer system location based on the predicted current geographic location of the virtual server.

10. A computer system for facilitating processing within a computing environment by enabling an owner of a virtual server of the computing environment determine a location of the virtual server, the computer system comprising:
a memory; and
a processing circuit in communication with the memory, wherein the computer system is configured to perform a method, the method comprising:
determining a baseline geographic location of the virtual server of the computing environment, the determining using triangulation processing and known locations of multiple reference servers of the computing environment,
wherein the virtual server is configured to be hosted on one of a plurality of host computing systems of the hosting provider, with a current host computing system hosting the virtual server varying over time without notifying the owner of the virtual server;
obtaining network communication-related data for communications between the multiple reference servers across a network;
generating a machine learning model to predict for a given time an actual geographic location of the virtual server, the machine learning model being generated using, at least in part, the baseline geographic location of the virtual server and the obtained network communication-related data such that the machine learning model is useable to locate the virtual server at different times as the location of the server varies;
using the machine learning model to predict for a current time a current geographic location of the virtual server based, at least in part, on current network communication-related data for communications between the virtual server and one or more of the reference servers; and
providing the current geographic location of the virtual server to the owner of the virtual server.

11. The computer system of claim 10, wherein the obtained network communication-related data for communications between the multiple reference servers includes latency data for communications between the reference servers, and trace route data for communications between the multiple reference servers.

12. The computer system of claim 10, wherein the obtained network communication-related data for communications between the multiple reference servers across the network comprise different network communication-related data types selected from the group consisting of: network characteristic data, metadata associated with the communications, IP addresses associated with the communications, time of day of the communications, and additional server metadata.

13. The computer system of claim 10, wherein the current network communication-related data for communications between the virtual sever and one or more of the reference servers includes latency data and trace route data for communications between the virtual server and the one or more of the reference servers.

14. The computer system of claim 10, wherein generating the machine learning model comprises performing polynomial regression to establish a function converting communication latency into distance between servers.

15. The computer system of claim 10, further comprising retraining the machine learning model with additional network communication-related data, the using comprising using the retrained machine learning model to predict for the current time the current geographic location of the virtual server based, at least in part, on the current network communication-related data for communications between the virtual server and the one or more reference servers.

16. The computer system of claim 15, wherein the retraining comprises using federated machine learning processing within the computing environment to retrain the machine learning model.

17. A computer-implemented method for facilitating processing within a computing environment by enabling an owner of a virtual server of the computing environment determine a location of the virtual server, the computer-implemented method comprising:
determining a baseline geographic location of the virtual server of the computing environment, the determining using triangulation processing and known locations of multiple reference servers of the computing environment,
wherein the virtual server is configured to be hosted on one of a plurality of host computing systems of the hosting provider, with a current host computing system hosting the virtual server varying over time without notifying the owner of the virtual server;
obtaining network communication-related data for communications between the multiple reference servers across a network;
generating a machine learning model to predict for a given time an actual geographic location of the virtual server, the machine learning model being generated using, at least in part, the baseline geographic location of the virtual server and the obtained network communication-related data such that the machine learning model is useable to locate the virtual server at different times as the location of the server varies;
using the machine learning model to predict for a current time a current geographic location of the virtual server based, at least in part, on current network communication-related data for communications between the virtual server and one or more of the reference servers; and
providing the current geographic location of the virtual server to the owner of the virtual server.

18. The computer-implemented method of claim 17, wherein the obtained network communication-related data for communications between the multiple reference servers includes latency data for communications between the reference servers, and trace route data for communications between the multiple reference servers.

19. The computer-implemented method of claim 17, wherein the obtained network communication-related data for communications between the multiple reference servers across the network comprise different network communication-related data types selected from the group consisting of: network characteristic data, metadata associated with the communications, IP addresses associated with the communications, time of day of the communications, and additional server metadata.

20. The computer-implemented method of claim 17, wherein the current network communication-related data for communications between the virtual server and one or more of the reference severs includes latency data and trace route data for communications between the virtual server and the one or more of the reference servers.

\* \* \* \* \*